May 15, 1956
D. A. ALSBERG
2,746,015
METHOD OF AND MEANS FOR MEASURING IMPEDANCE AND RELATED QUANTITIES
Filed Dec. 20, 1950
5 Sheets-Sheet 1
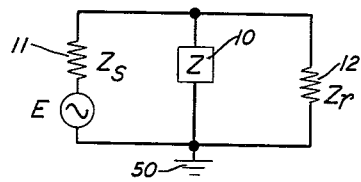
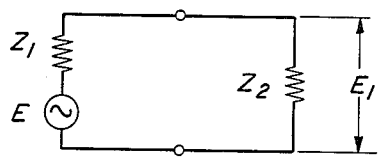
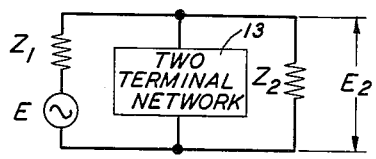
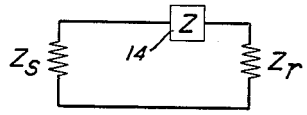
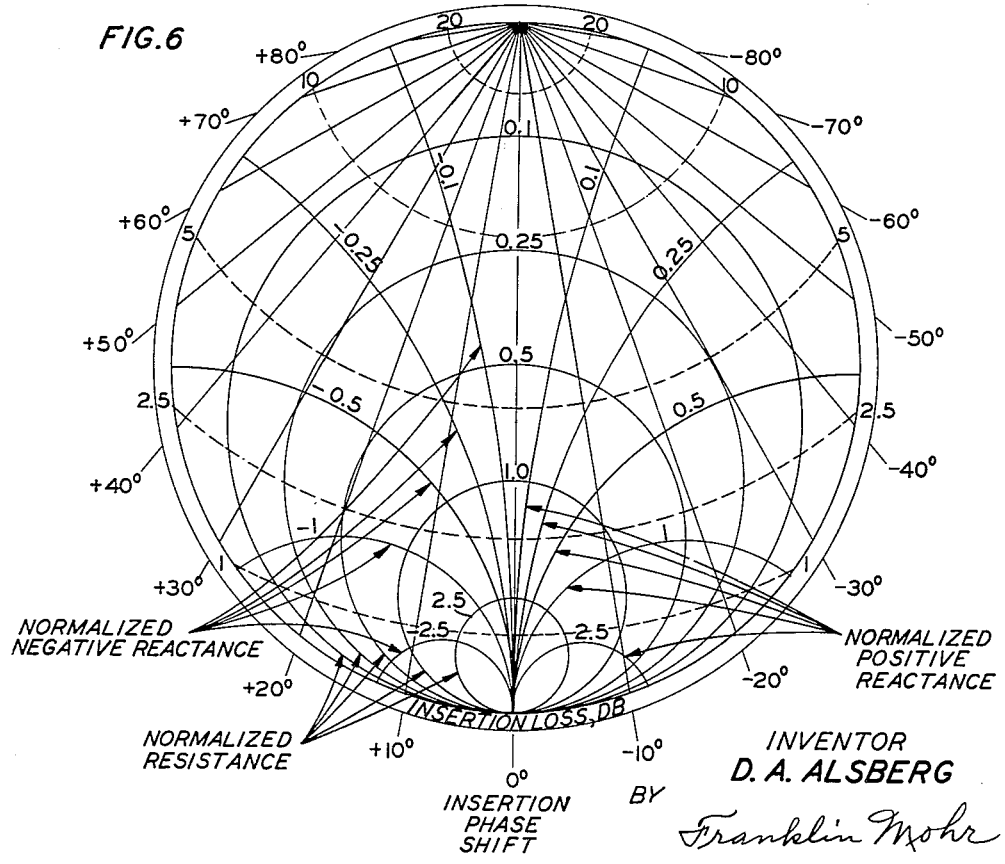
INVENTOR
D. A. ALSBERG
BY Franklin Mohr
ATTORNEY May 15, 1956

D. A. ALSBERG 2,746,015

METHOD OF AND MEANS FOR MEASURING IMPEDANCE AND RELATED QUANTITIES

Filed Dec. 20, 1950

INSERTION LOSS (db) AND PHASE (°) OF SHUNT IMPEDANCE Z BETWEEN 75 OHM (50 OHM) TERMINATIONS

INVENTOR
D. A. ALSBERG
BY
Franklin Mohr
ATTORNEY

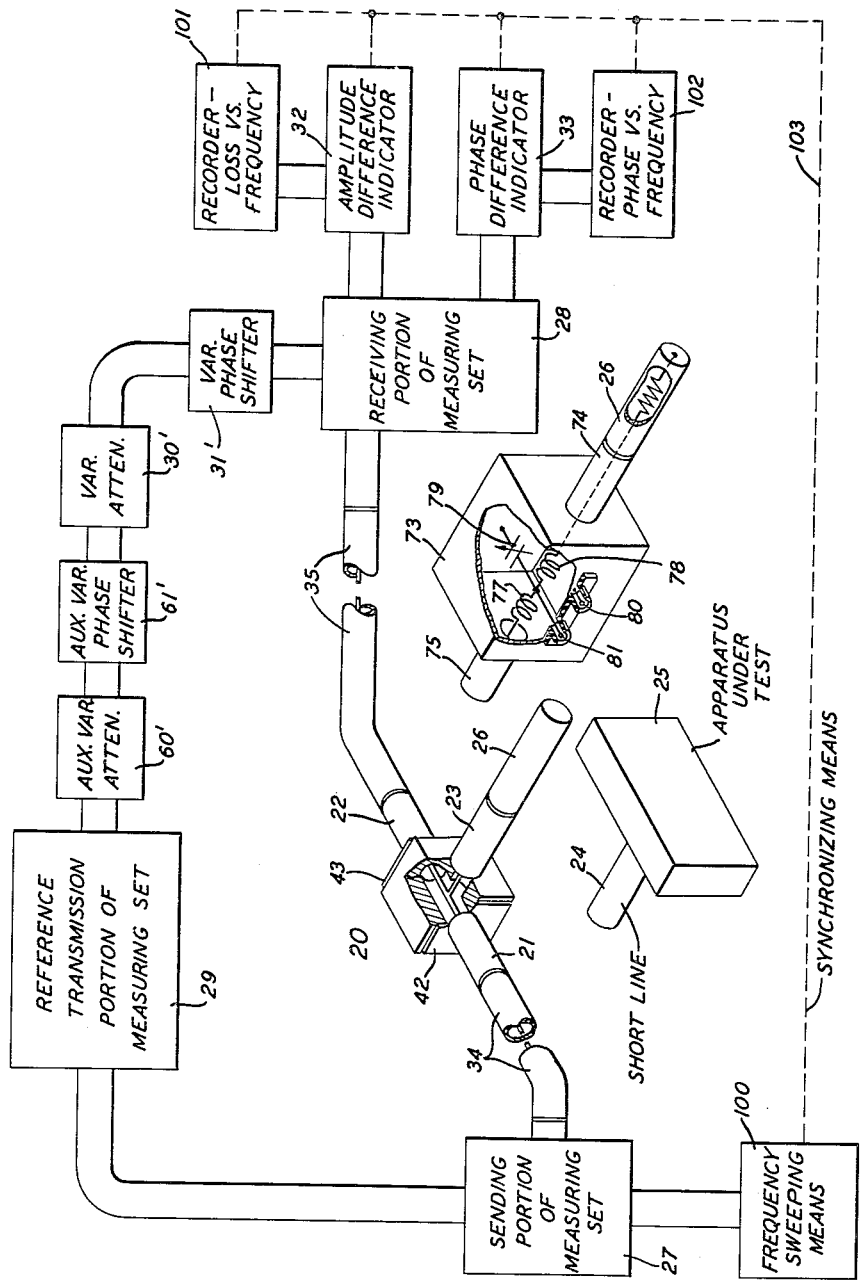

INVENTOR
D.A. ALSBERG
BY
Franklin Mohr
ATTORNEY

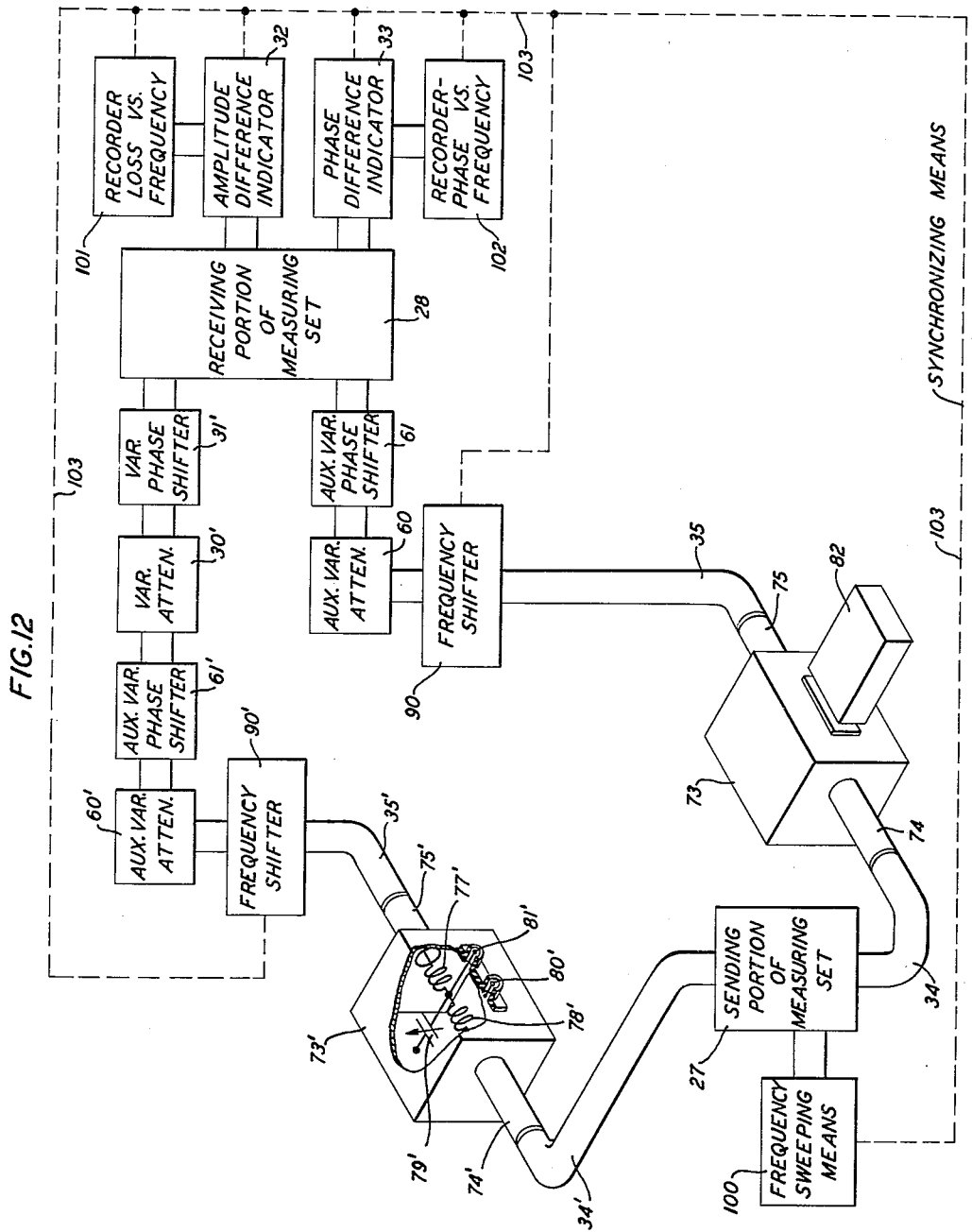

¹

2,746,015
METHOD OF AND MEANS FOR MEASURING IMPEDANCE AND RELATED QUANTITIES
Dietrich A. Alsberg, Berkeley Heights, N. J., assignor to Bell Telephone Laboratories, Incorporated, New York, N. Y., a corporation of New York Application December 20, 1950, Serial No. 201,781

13 Claims. (Cl. 324—58)

This invention relates to means and methods of electrical measurements and more particularly to measurement of electrical impedance of two-terminal networks.

In complicated transmission systems, as the number of links constituting the system increases, the electrical properties of the component elements must be held within narrower and narrower limits of tolerance and such properties must therefore be measured with increased precision. Some examples are (1) a projected 4,000-mile long coaxial cable system including about 1,000 repeaters in tandem, and (2) a projected microwave radio relay system of similar length including about 170 repeater stations in tandem. In such systems very precise impedance requirements must be laid down for the individual components, since even small impedance irregularities can, in their summed effect, result in severe impairment of the transmission characteristics of the system as a whole. In many cases it is insufficient to measure impedances at discrete frequencies, and so-called swept-frequency methods must be adopted in order to detect significant impedance irregularities. Often it is desired to measure impedances in places or at positions which do not permit short leads to the measuring circuit. Impedance bridges do not lend themselves readily to swept-frequency techniques. They must be located close to the impedance element to be measured, and in some applications do not possess adequate accuracy. Slotted sheaths with inserted probes in coaxial or wave guide lines are not adapted to swept-frequency methods, nor are systems using a plurality of voltmeters.

Numerous devices for impedance measurement have been developed using reflected waves, as in hybrid coils, directional couplers, and the so-called magic tee. While these are adapted to swept-frequency techniques, they all require some form of mutual coupling, which restricts the band width over which they are usable with such techniques. The internal phase shift changes and attendant calibration corrections of these devices being very considerable, swept-frequency measurements have been practically restricted to the magnitude of the impedance without regard to the phase angle of the impedance.

It is an object of the present invention to facilitate and improve the accuracy of impedance measurements by employing the technique of transmission measurements.

It is well known to derive the transmission properties of a network from impedance measurements made upon its component elements. Conversely, impedance properties of a network can be determined from transmission measurements.

In accordance with the invention, an unknown impedance is inserted in shunt or in series between known generator and detector impedances and insertion loss or gain and insertion phase shift measurements are made thereon. From the latter measurements, the required impedance is readily computed or may be read from charts. The charts are entered with the measured phase shift and loss data and the impedance components, both reactive and resistive, are read directly, irrespective of the frequency. The charts do not involve the frequency as a parameter.

A feature of the invention is that impedance is measured as a transmission property, constant impedance corresponding to constant transmission, and frequency not being directly involved.

Another feature is that the disturbance created in the transmission line by insertion of the impedance to be measured is the quantity directly of interest rather than an actual disturbing factor.

A further feature is that the accuracy of the determination of impedance depends upon measuring small losses and small phase shifts with great precision rather than upon measuring large losses and large phase shifts with lesser precision.

A still further feature is the adaptability to measurement of impedances of elements which are located at points remote from the measuring set proper.

A still further feature of the invention is a means and method of nullifying a portion of a compound impedance network to prevent a modifying effect by said portion upon impedance measurement of the remainder of the network. A particular application of this feature is in the measurement of the inherent impedance versus frequency characteristic of a piezoelectric unit in which the modifying effect of the capacitance of the energizing electrodes is nullified.

The invention makes use of frequency sweeping means, such as motor-driven tuning elements, reactance tubes and other known mechanical and electronic means, for rapidly varying the measuring frequency over a wide frequency band. The invention also utilizes heterodyne detecting means or frequency shifters in order that variable or fixed attenuators and phase shifters may be operated at a fixed frequency whereby design requirements upon such devices are made much less severe. Readings of loss and phase may be indicated upon calibrated attenuators and phase shifters or by means of meters, cathode-ray oscilloscopes, recorders, or other known indicating means.

It has been found that the invention makes possible the securing of impedance determining data in a swept-frequency system with considerably greater accuracy than was possible heretofore.

In the drawings:

Figs. 1, 2, 3A, 3B, 4 and 5 are diagrams useful in explaining the invention;

Fig. 6 is a chart of impedances in terms of transmission measurements for a generalized case;

Fig. 9 is a schematic diagram of one form of a measuring system in accordance with the invention;

Fig. 12 is a schematic diagram of another form of measuring system, especially for testing piezoelectric crystal units;

Figure 7:
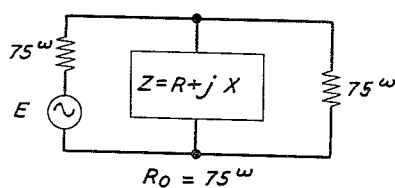
Fig. 7 is a diagram relating to a 75-ohm circuit.

Fig. 1 is the well-known simple schematic representation of a two-terminal element 10 of impedance Z inserted as a shunt across a sending branch 11 of impedance $Z_s$ and a receiving branch 12 of impedance $Z_r$. By a slight change in point of view, the impedance $Z$ may alternatively be regarded as facing the parallel combination of $Z_s$ and $Z_r$ as shown in Fig. 2. Since in rather commonly encountered practical cases $Z_s$ and $Z_r$ are substantially equal, and since the impedance of two equal elements connected in parallel is one-half the impedance of either element alone, it is convenient to define a nominal impedance $Z_0$ by the equation $$Z_0 = \frac{2Z_s Z_r}{Z_s + Z_r} \quad (1)$$

Accordingly, the impedance element $Z$ as connected in Figs. 1 and 2 faces an impedance of $\frac{1}{2} Z_0$.

The present invention makes use of any known means and method for measuring insertion loss and insertion phase shift, adapting such means and method to the condition in which a two-terminal network is inserted into a reference transmission line having a known sending impedance and a known receiving impedance. In this connection the terms "insertion loss" and "insertion phase shift" are defined for a shunt insertion of a two-terminal network by reference to Figs. 3A and 3B in which Fig. 3A shows a source of voltage $E$ having an impedance $Z_1$ connected to a load having an impedance $Z_2$ across which load there is developed a voltage $E_1$, and Fig. 3B shows the same circuit as in Fig. 3A but having a two-terminal network 13 connected across the line between the source and the load and having a voltage $E_2$ developed across the load in response to the same source voltage $E$. Insertion loss is defined as the ratio of the amplitude of $E_1$ to the amplitude value of $E_2$ in Figs. 3A and 3B regardless of phase difference, and insertion phase shift is defined as the difference in phase between the voltages $E_1$ and $E_2$ in Figs. 3A and 3B.

The usual network solutions for $E_1$ and $E_2$ may be expressed in terms of $E$, $Z$, $Z_0$ and $Z_1$ as follows:

$$E_1 = \frac{Z_0 E}{2 Z_1} \quad (2)$$

$$E_2 = \frac{Z Z_0 E}{2 Z_1 \left( Z + \frac{1}{2} Z_0 \right)} \quad (3)$$

from which the ratio of $E_1$ to $E_2$ may be expressed as $$\frac{E_1}{E_2} = e^{\alpha + j\beta} = 1 + \frac{1}{2Z/Z_0} \quad (4)$$

This is a vector ratio in which $e^\alpha$ is the ratio of the amplitudes of $E_1$ and $E_2$ regardless of phase and $e^{j\beta}$ is a vector operator representing the phase difference between the vectors $E_1$ and $E_2$. Thus, by definition, $e^\alpha$ is the insertion loss and $\beta$ is the insertion phase shift.

In the case $Z_0$ is a pure resistance of value $R_0$, Equation 4 reduces to $$e^{\alpha + j\beta} = 1 + \frac{1}{2Z/R_0} = 1 + \frac{1}{2(R/R_0 + jX/R_0)} \quad (5)$$

where $R$ and $X$ are the resistive component and reactive component respectively of the impedance $Z$.

Equations of the same general form are readily derivable for the case of a two-terminal network 14 (Fig. 4) inserted as a series element in a reference transmission line having known sending and receiving impedances, provided the network is treated as a series admittance $Y$ (Fig. 5) and the sending and receiving impedances are treated as a series combination of impedances and a quantity $Y_0$ is defined as follows:

$$Y_0 = \frac{2}{Z_s + Z_r} \quad (6)$$

The resulting equations are $$e^{\alpha + j\beta} = 1 + \frac{1}{2Y/Y_0} \quad (7)$$

for reference transmission lines generally and $$e^{\alpha + j\beta} = 1 + \frac{1}{2Y/G_0} = 1 + \frac{1}{2(G/G_0 + jB/G_0)} \quad (8)$$

when $Y_0$ is a pure conductance $G_0$ and $G$ and $B$ are the conductive component and susceptive component respectively of the admittance $Y$.

It will be noted that Equations 5 and 8 are both in the same general form $$e^{\alpha + j\beta} = 1 + \frac{1}{u + jv} \quad (9)$$

In Equation 9 the loci of constant loss or gain and of constant phase shift form families of orthogonal circles if $u$ and $v$ are plotted in rectangular coordinates. Plots of this kind are available, for example, in a Bell Telephone System monograph, No. B–1643, entitled "Equalizer Charts," wherein $u$ and $v$ are called $G$ and $B$, respectively.

A further useful transformation of coordinates may be made according to the following equation:

$$u + jv = \frac{1 + \zeta}{1 - \zeta} \quad (10)$$

where $\zeta$ is a complex number. Plotting $u$ and $v$ as functions of $\zeta$ results in families of orthogonal circles representing $u$ and $v$ and gives a plot of the form shown by P. H. Smith in an article entitled "An improved transmission line calculator," published in Electronics, vol. 17, No. 1, pages 130–133, January 1944, at page 131, and also shown in vol. 12, No. 1, pages 29–31, January 1939, Fig. 3.

Fig. 6 is such a plot showing normalized resistance and reactance as functions of insertion loss in decibels and insertion phase shift in degrees. It differs from the usual "Smith chart" in a scale factor of one-half arising from the use of a factor 2 in the definitions of $Z_0$ and $Y_0$. The outside rim of the chart $u = 0$ in Fig. 6 is the unit circle in the $\zeta$ plane. The lines of constant insertion loss are circles centered on the point $u = 0$, $v = 0$, at the topmost point of the chart. Expressing the insertion loss in decibels and designating it as $\alpha(db)$, the equation for a circle of constant insertion loss in terms of $\zeta$ is:

$$\alpha(db) = -20 \log_{10} \left| \frac{1 + \zeta}{2} \right| \quad (11)$$

Lines of constant insertion phase shift are the radii of the loss circles in the $\zeta$ plane. The chart of Fig. 6 presents the portion of the complex impedance plane which includes positive resistances associated with positive and negative reactances. It is presented on a normalized impedance basis, the normal impedance being $R_0$. Charts on this plan may be prepared which give an accuracy of two significant figures and have a supplemental use in determining what ranges of loss values and phase shift values a measuring set must cover to take care of any selected subdivision of the entire impedance plane.

In Fig. 6 the loci of constant insertion loss in decibels are circular arcs concentric about the topmost point of the chart. The loss values are in decreasing amount from top to bottom of the chart, the zero loss arc shrinking to a single point at the bottommost point of the chart. The loci of constant insertion phase shift in degrees are radial lines passing through the topmost point of the chart. Zero phase shift is represented by the vertical diameter of the chart. Positive phase shift lines are inclined downward to the left and negative phase shift lines are inclined downward to the right, in each case diverging more and more from the vertical for increasing phase shift values, the 90-degree lines shrinking to a single point at the topmost point of the chart. The loci of constant resistance are circles tangent to the outer rim of the chart at the bottommost point of the chart and increasing in diameter as the resistance value decreases. The locus of resistance $\frac{1}{2} R_0$ passes through the center point of the chart. The loci of constant reactance are arcs of circles tangent to the zero phase shift line at the bottommost point of the chart. The circle diameters increase as the reactance values decrease. Circles of constant negative reactance lie to the left of the zero phase shift line and circles of constant positive reactance lie to the right. The zero reactance locus is a vertical straight line coinciding with the zero phase shift line.

Fig. 7 is a circuit diagram like Fig. 1 but drawn for the special case in which the sending and receiving impedances are each pure resistances of 75 ohms. In this case $Z_0$ is also a pure resistance $R_0$ and is 75 ohms.

Figure 8:
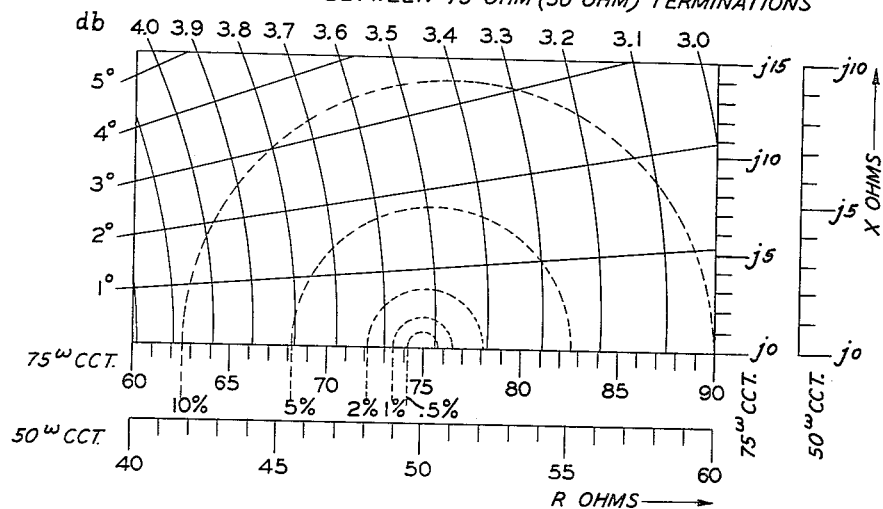
Fig. 8 is a chart of impedances in terms of transmission measurements, specifically related to 75-ohm and 50-ohm circuits.

Fig. 8 is a chart plotted especially for the circuit of Fig. 7. It covers a limited part of the field, in the range of ±20 per cent deviation from the nominal 75-ohm impedance of the reference transmission line and is labeled for resistances and reactances in actual values in ohms. A supplemental scale is provided making the chart also direct reading in ohms for a reference transmission line of 50 ohms.

The published equalizer charts may be used for impedances which are outside the range of Fig. 8 or where other charts do not have the required resolution. The published charts may be used for any nominal value of the impedance of the reference transmission line and are not limited to 75-ohm and 50-ohm pure resistance lines. As above mentioned, when equalizer charts are used it should be noted that the definitions of $Z_0$, $R_0$, $Y_0$ and $G_0$ as used herein differ by a factor of 2 from the definitions commonly used in equalizer design. Hence, the values of the coordinates G and B in the published equalizer charts must usually be divided by 2 to yield normalized values used herein. Dotted circular arcs of constant reflection coefficient in per cent are shown in Fig. 8 for reference.

It will be evident from an inspection of Fig. 8 that accurate measurements in the portion of the impedance plane depicted therein depend upon measuring small losses and small phase shifts with high accuracy. The method of the present invention is thus contrasted with the known methods involving reflected waves and the measurement of loss and phase shift in the returned wave, in that the return loss and phase method depends upon measuring large losses and large phase shifts with lesser accuracy. An advantage of the insertion method over the return wave method is that in the insertion method the transmission perturbation introduced by the measuring procedure is directly related to the impedance being measured, while in the return method mutual impedance is involved as an intermediate coupling link. Such mutual coupling imposes restrictions upon both the band width and the accuracy of measurement, since an ideal broadband mutual coupling is unattainable in practice.

Fig. 9 shows an illustrative system embodying the invention. A transmission line T joint 20 is provided with main arms 21 and 22 for insertion in an insertion loss and phase shift measuring system of any suitable known sort. The T joint has a side branch arm 23 to which may be connected alternately a line 24 leading to an apparatus 25 under test, such as a network, and a standardized impedance element 26. The insertion loss and phase shift measuring system is shown for clarity as being divided into a plurality of block portions between certain of which the T joint 20 is inserted. These block portions include a sending portion 27, capable of generating test frequencies variable over a frequency band, preferably relatively wide, and controlled, if desired, by frequency sweeping means 100, a receiving portion 28, a reference transmission portion 29, a variable attenuator 30', a variable phase shifter 31', an amplitude difference indicator 32 and a phase difference indicator 33. It is convenient to include also an auxiliary variable attenuator 60' and an auxiliary variable phase shifter 61', either in the reference line as shown or in the line containing the T joint 20, as may be required, in the form of an auxiliary variable attenuator 60 and an auxiliary variable phase shifter 61 in Fig. 12. An extension line 34 of any desired length may be used to connect the T joint main arm 21 to the sending portion 27 and another extension line 35 of any desired length may be used to connect the main arm 22 to the receiving portion 28. The indicators 32 and 33 may, if desired, be connected to recorders 101 and 102, respectively, which may have frequency sweeps synchronized with the sweeping means 100 in any known manner as indicated schematically by a broken line connection 103. The indicators 32 and 33 may also have frequency sweeps controlled by the connection 103.

Figure 10:
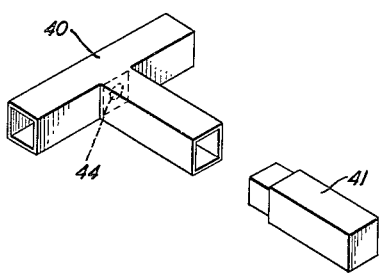
Fig. 10 is a perspective view of a wave guide T joint and terminating element useful as an alternative structure in a system of the form shown in Fig. 9.

While the T joint 20, lines 24, 34, 35, and element 26 are illustrated as of the coaxial cable type they may be otherwise constructed. The T joint may be of any suitable construction, as for example a wave guide T 40 as shown in Fig. 10, fitted with a wave guide standardized impedance element 41 and a coupling aperture 44, and the various interconnecting lines of the system of Fig. 9 may be coaxial, wave guide, parallel wire, or other suitable structures. The central portion of the T 20 may be formed from two solid blocks of metal fastened together with end plates 42 and 43, or in other suitable manner. It is very desirable that the branch line 23 and line 24 be electrically short in order to avoid long-line effects which will make the impedance inserted into the main line comprising arms 21 and 22 different from the impedance of the apparatus to be tested or of the standardized impedance element.

In the operation of the system of Fig. 9, the use of the standardized impedance element 26 contributes considerably to the precision with which impedance measurements can be made. Use of the element 26 may, however, be omitted if less precision is required, and it will first be assumed that such use is omitted. It is assumed that the impedances of the measuring set are known as these impedances appear at the central junction point of the T joint 20. With the element 26 removed from the branch arm 23 an open circuit condition is obtained at the T junction which serves as one form of a reference condition. For convenience in taking readings the variable attenuator 30' and the variable phase shifter 31' may both be set to zero with the system in the reference condition. Leaving the devices 30' and 31' at the zero settings and assuming the measuring set to be energized at a frequency at which an impedance measurement is desired, the auxiliary variable attenuator 60' and the auxiliary variable phase shifter 61' are each adjusted until simultaneously no amplitude difference and no phase difference are observed in the receiving portion of the measuring set as indicated respectively by the amplitude difference indicator 32 and the phase difference indicator 33.

The apparatus 25 to be measured may next be inserted into the measuring system by plugging the line 24 into the branch arm 23. The effect of the insertion will generally be to introduce differences between the two transmission paths of the measuring set which differences are indicated by the devices 32 and 33. Leaving the devices 60' and 61' undisturbed in their settings, the variable attenuator 30' and the variable phase shifter 31' are then each adjusted until again no amplitude difference and no phase difference are indicated by the devices 32 and 33. The reading of the variable attenuator 30' then gives directly the insertion loss due to the line 24 and apparatus 25 and the reading of the variable phase shifter 31' gives directly the corresponding insertion phase shift. From these readings the impedance components of the inserted apparatus may be obtained from charts or by computation in accordance with known transmission line theory.

The frequency sweeping means 100 may comprise a motor-driven tuning element, a reactance tube, or other known mechanical or electronic means of rapidly varying the measuring frequency, preferably over a wide frequency band. The indicators 32 and 33 may include meters calibrated in decibels and phase angle degrees respectively or they may comprise cathode-ray oscilloscopes with a frequency sweep controlled by the sweeping means 100 through the synchronizing means 103. The recorders 101 and 102 may likewise be calibrated and synchronized.

A convenient method of making measurements over a wide frequency band is first to insert the standard impedance element in the circuit and sweep the measuring frequency over the whole available frequency range, by means of the sweeping means 100, recording the results on the recorders 101 and 102. Then, the apparatus or network to be tested is substituted for the standard impedance element and the measuring frequency is swept over the same range and new records made preferably on the same paper with the first records in register therewith in order that differences in loss (in decibels, for example) between two recorded curves, in recorder 101, one for the standard impedance element and one for the network under test will determine the insertion loss of the network under test and differences in phase (in degrees), in recorder 102, will determine the insertion phase shift of the network under test.

If the measuring set is in substantially perfect adjustment, the measurement of the standard impedance element will show no change on the recorder as the frequency is swept through the band, and in this case the recording of a reference trace on the recorder can be dispensed with.

In many cases it is difficult to evaluate the exact loss and phase effect of any fixture, T joint or the like, used to insert the unknown impedance into the loss and phase measuring circuit, but this uncertainty is greatly reduced by adopting a simple procedure involving the use of a calibrated standard impedance element such as the element 26. To establish a reference condition for the circuit the element 26 is made an element of accurately known impedance value, which value is very advantageously made equal to $Z_0$, or, for example, 75 ohms pure resistance as near as may be, in the case illustrated in Fig. 7. With the element 26 plugged into the branch arm 23 in the system of Fig. 9, the test circuit is adjusted by means of the auxiliary variable attenuator 60' and the auxiliary variable phase shifter 61' to bring the readings of the devices 30' and 31', respectively, to the theoretical readings corresponding to the nominal value of the element 26.

For example, referring to Fig. 8 it is found that for a 75-ohm pure resistance inserted into a nominal 75-ohm pure resistance circuit the theoretical value of insertion loss is 3.52 decibels and the theoretical value of insertion phase shift is zero degrees. Accordingly, with a 75-ohm standard resistor inserted in a nominal 75-ohm resistive circuit the variable attenuator 30' is preset to read 3.52 decibels, the variable phase shifter 31' is preset to read zero degrees and the devices 60' and 61' are adjusted until zero differences are indicated in the indicators 32 and 33. This setting is then as precise as the precision to which the impedance of the 75-ohm standard resistor is known and is used in place of the reference condition hereinabove described wherein the open-circuited condition of the branch arm 23 was used.

The measuring set having been set to reference condition by use of the standardized impedance element as hereinabove described, the unknown apparatus may be substituted for the standard element and the insertion loss and phase shift determined therefor by readjusting the devices 30' and 31' while leaving the auxiliary devices 60' and 61' undisturbed. The readings of the devices 30' and 31' then give the insertion loss and phase shift directly.

In any case, the impedance measured is the impedance at the junction point of the T fixture. Usually the impedance to be measured cannot be inserted immediately at the junction point, due to physical limitations, and a transmission line is used between the junction point and the unknown impedance. If the surge impedance of the connecting line and the unknown impedance are significantly different, the measured impedance value must be corrected for the effect of the line as required by known transmission line theory. Use of the Smith chart is useful in making such corrections.

To reduce the importance of such correction the connection between the unknown impedance and the junction point should be made as short as physically possible, preferably a very small fraction of a wave length, and whatever additional length of connection may be necessary should be introduced in the lines connecting the junction point to the sending portion and receiving portion, respectively, of the measuring set. In Fig. 9 this is done by extending the lines 34 and 35 as required. The impedance of these connecting lines can be measured precisely, however, and if found to be substantially different from the design impedance $Z_0$ or $R_0$, for example, significant errors can be computed as explained hereinafter. Accordingly, it is possible to measure an unknown impedance located as remotely from the measuring set as may be desired without impairing the accuracy of measurement. Auxiliary means such as a telegraph or telephone line may, of course, be needed in order that personnel at the measuring set location and at the location of the apparatus under test may communicate during the measurements.

In order to measure a two-terminal impedance to a high order of accuracy, it is necessary that the impedance to be measured be adequately defined, that is isolated from stray impedances, or that the measuring circuit be so arranged as to render the stray impedances impotent to disturb appreciably the accuracy of the measurement. A satisfactory condition is usually obtained if one terminal of the impedance can be grounded during the measurement. At high frequencies the measurement of a two-terminal impedance with both terminals off ground, using the insertion loss and phase shift method, yields a result in which the stray impedances to ground are included in the measured impedance. Hence the measuring circuit of Fig. 1, wherein the network to be measured is inserted as a shunt element, which can be grounded as at 50, is often of more practical value than the circuit of Fig. 4 wherein the network is inserted as a series element. While superficial inspection of Fig. 6 would appear to indicate that high accuracies could be attained measuring large impedances as series admittances, the larger the impedance becomes the more significant are the stray impedances to ground, which are part of the measurement.

Fig. 12 shows a modification of the arrangement of Fig. 9 for convenient and accurate measurement of the impedance of a piezoelectric crystal unit independently of the capacitive reactance of the electrodes between which the crystal unit is operated.

Figure 13:
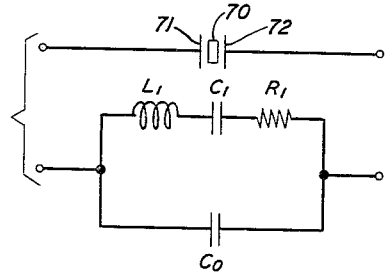
Fig. 13 is a conventional schematic representation of a piezoelectric crystal unit and the equivalent circuit therefor.

Fig. 13 shows schematically the well-known equivalent circuit of a piezoelectric crystal unit comprising a crystal 70 mounted in conventional manner between electrodes 71 and 72. The inherent impedance of the crystal is regarded as that of a series resonant circuit of inductance $L_1$, capacitance $C_1$, and resistance $R_1$, this circuit being paralleled by a capacitance $C_0$ which latter comprises almost exclusively the capacitance of the electrode system 71, 72.

In the arrangement of Fig. 12 there is provided in place of, or as part of, the reference transmission portion 29 of the measuring set of Fig. 9 as shielding box 73' and a preferably substantially identical shielding box 73 is provided in place of the T fixture 20. Shielding boxes 73 and 73' respectively are connected through input lines 74 and 74' to lines 34 and 34' respectively, and through output lines 75 and 75' to lines 35 and 35' respectively.

The boxes 73 and 73' contain respectively inductors 77, 78 and 77', 78', variable capacitors 79 and 79', and terminals 80, 81 and 80', 81', for connecting to a piezoelectric crystal unit. Such a unit 82 is shown plugged into the box 73. The elements in both boxes are shown schematically in Fig. 16 while the primed elements are shown through a broken-away portion of box 73' in Fig. 12.

Figure 14:
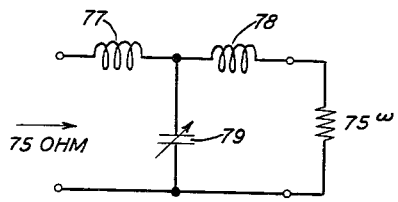
Fig. 14 is a schematic diagram of certain elements of the system of Fig. 12.

The groups of elements 77, 78, 79 and 77', 78', 79' each form an adjustable low-pass filter section the surge impedance of which can be varied by varying the respective capacitor 79 or 79'. When adjusted to a surge impedance equal to the terminating impedance the filter section is electrically transparent, the impedance looking into the filter section being the same as the terminating impedance. Fig. 14 shows the filter section schematically as adjusted to a 75-ohm resistance termination. The range of variation of the capacitance of the element 79 or 79' should be such as, in conjunction with the inductance values of the respective elements 77, 78 or 77', 78', to include the nominal impedance value of a terminating element such as 26 which may be used in adjusting the filter to substantial transparency. The cut-off frequency of the low-pass filter section is preferably made high in comparison with the highest measuring frequency, in order to insure substantially constant impedance looking into the terminated filter section and also negligible deviation from linear phase shift in the filter, over the whole range of measuring frequencies.

Figure 15:
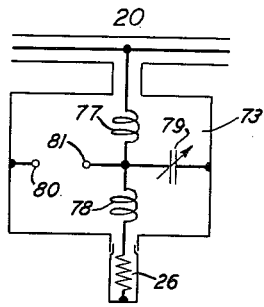
Figs. 15 and 16 are schematic diagrams useful in explaining the operation of the system of Fig. 12.

Before making measurements with the arrangement of Fig. 12, the boxes 73 and 73' are first individually adjusted in the following manner. The arrangement of Fig. 9 may be used, with the standard resistor 26 plugged into the arm 23, as shown. The variable attenuator 30' is set to read 3.52 decibels, and the variable phase shifter 31' is set to read zero degrees. A balance is then obtained by adjusting the devices 60' and 61' until null readings are obtained on the indicators 32 and 33, leaving the settings of devices 30' and 31' undisturbed. One of the boxes, say box 73, is then inserted between the branch arm 23 and the standard resistor 26 as indicated in Fig. 15. The indicators 32 and 33 may then be restored to null readings by an adjustment of the variable capacitor 79. When this adjustment is completed the filter 77, 78, 79 has in effect been rendered electrically transparent by virtue of the adjustment of the surge impedance of the filter to match the impedance of the standard resistor 26. The second box, say box 73', terminated in the standard resistor 26 is then substituted for the combination of box 73 and resistor 26, and the box 73' is adjusted by varying the capacitor 79'. During the adjustment of box 73', the settings of the devices 30', 31', 60' and 61' are to be left unchanged and the adjustment is to be continued until null readings are secured on the indicators 32 and 33.

Next, the balanced boxes 73 and 73' are connected in line as shown in Fig. 12 but with the crystal unit 82 still disconnected. As the two transmission paths of the measuring set are now substantially identical, the setting of the variable attenuator 30' should now be set at zero decibels and the variable phase shifter 31' should be set at zero degrees. The auxiliary variable elements 60, 61, 60' and 61' can be adjusted at any convenient test frequency until simultaneous null readings are obtained in the indicators 32 and 33. It should then be found that the test frequency may be varied over a wide range without any material differences developing in either the amplitude or the phase as indicated by the devices 32 and 33. If there is a slight difference observable at some frequencies, the balance can often be improved by making a slight arbitrary readjustment of the setting of one of the capacitors 79 or 79', by trial and error, until an optimum adjustment is secured.

Figure 16:
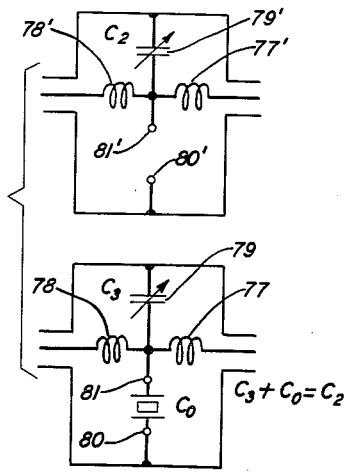

Now, with a test frequency chosen to be remote from the nominal resonant frequency of the crystal unit 82 or other crystal unit to be tested, the crystal unit is plugged into box 73 as shown in Fig. 12 and also schematically in Fig. 16. The capacitor 79 is then readjusted to restore simultaneous null readings in the indicators 32 and 33, it being necessary to reduce the capacitance $C_2$ of the capacitor 79 by the amount of $C_0$, the shunt capacitance inserted by the crystal unit. The new value of the capacitance $C_3$ is indicated in Fig. 16, and may be expressed by means of the equation $$C_3 + C_0 = C_2 \qquad (23)$$

Impedance measurements may now be made in any part of the frequency range of the measuring set and impedance values obtained at each frequency, the results relating substantially solely to the circuit branch $L_1$, $R_1$, $C_1$ of Fig. 13 and being substantially independent of the value of $C_0$.

Impedance measurements made in this way may be used in inspecting crystal units with respect to the operating frequency, those units falling within a specified frequency band being accepted and those falling outside the band being rejected. For this kind of a test the normal impedance value is low and consequently the shunt impedance circuit of Fig. 2 gives high precision. Impedance measurements may also be used to reveal the frequency and intensity of spurious oscillations, due to the crystal vibrating in modes other than the desired mode. These modes appear as peaks of relatively high impedance, which are more readily made evident in the series circuit of Fig. 4. Therefore, both the shunt and the series forms of the measuring circuit have their advantages in the testing of crystal units.

The system of the invention is readily adaptable to swept-frequency methods wherein the test frequency oscillator is variable in frequency and may be swept over its frequency range by means such as an electric motor or by electronic means, or otherwise. The receiving circuit may be simultaneously tuned as by a variable condenser driven by the same motor or in some other known manner. The loss and phase shift may be read directly upon dials incorporated in the adjustable attenuator and the adjustable phase shifter respectively, or the values may be recorded by means of any suitable recorder. Deflections of the difference indicators 32 and 33 reveal immediately any significant impedance variations.

The system of the invention is also well adapted to pulsing methods, that is, the sending portion may deliver pulses of alternating current separated by pauses, instead of delivering a continuous wave.

In order to utilize the advantages of operating the variable attenuators and phase shifters at a single fixed frequency, it is preferable to employ frequency shifters 90 and 90', which may be heterodyne detectors, in the respective transmission paths to shift the measuring frequency to the desired fixed (intermediate) frequency as is well known in the art. Loss and phase measuring systems employing the heterodyne principle are described in the copending applications of D. A. Alsberg and R. P. Muhlsteff, Serial No. 65,208, now Patent 2,622,127, and of D. Leed, Serial No. 65,130, filed December 14, 1948, now Patent 2,610,297, and in an article by D. A. Alsberg and D. Leed entitled "A precise direct reading phase and transmission measuring system for video frequencies," published in the Bell System Technical Journal, vol. 28 (1949), pages 221–238. The frequency shifters 90 and 90' may be controlled by the frequency sweeping means 100 through the synchronizing means 103.

The use of the variable attenuators and variable phase shifters as described may be dispensed with by calibrating the difference indicator 32 to read differences of amplitude in terms of decibels or other suitable units and calibrating the phase difference indicator 33 in terms of degrees of phase difference. The transmission characteristics of the two transmission paths may then be compared directly by observing the readings of the indicators 32 and 33. Also, one or more adjustable attenuators and one or more adjustable phase shifters may be used together with the calibrated difference indicators. In this way the difference indicators may be brought to desired nominal readings in manner similar to that which has been described hereinabove for bringing the main adjustable attenuator and phase shifter to desired nominal readings.

As in the arrangement of Fig. 9, the system of Fig. 12 may also utilize frequency sweeping means 100, recorders 101 and 102, and synchronizing means 103.

Inspection of Fig. 6 shows that as the impedance increases the accuracy decreases. For instance, from Fig. 6 for an impedance of 750 ohms (for which $R/R_0$ is 10) a resolution of 0.01 decibel corresponds to a 20-ohm uncertainty or 2.5 per cent. At low impedances, however, the accuracy is high. For instance an impedance of 1.5 ohms (for which $R/R_0$ is 0.02) corresponds to a loss of about 28 decibels and a resolution of 0.02 decibel applied to this figure yields an impedance uncertainty of about 0.003 ohm or 0.2 per cent.

In a 75-ohm equipment which has been built and used the following ranges have been covered:

Frequencies: 0.05 megacycle to 20 megacycles (9 octaves)
Loss range: 0 to 70 decibels
Accuracy: Absolute accuracy when used with recording equipment, ±0.02 decibel (up to 30 decibels loss) and ±0.1 degree. Differential accuracy when used with recording equipment, ±0.01 decibel and ±0.05 degree, differential accuracy with special technique, ±0.002 decibel and ±0.01 degree.
Drift in zero reference adjustment, less than 0.002 decibel per megacycle and less than 0.01 degree per megacycle.

The above listed differential accuracy limit of 0.01 decibel and 0.05 degree was imposed upon the system by the limit of the circuit stability. From Fig. 8 it may be determined that with this limit the accuracy of an impedance measurement in the vicinity of 75 ohms is ±0.25 per cent. By increasing the indicating meter sensitivity and averaging a number of consecutive measurements the statistical differential accuracy of 0.002 decibel and ±0.01 degree above listed was obtained, corresponding to impedance measurement accuracy of ±0.05 per cent at 75 ohms.

Using coaxial line techniques and thin film type resistors, standards have been designed that are good for all frequencies up to about 80 megacycles. The reactance component of such a standard resistor is less than 0.1 per cent of the nominal impedance and the resistance component can be determined with high precision by well-known methods of direct-current measurement.

Figure 11:
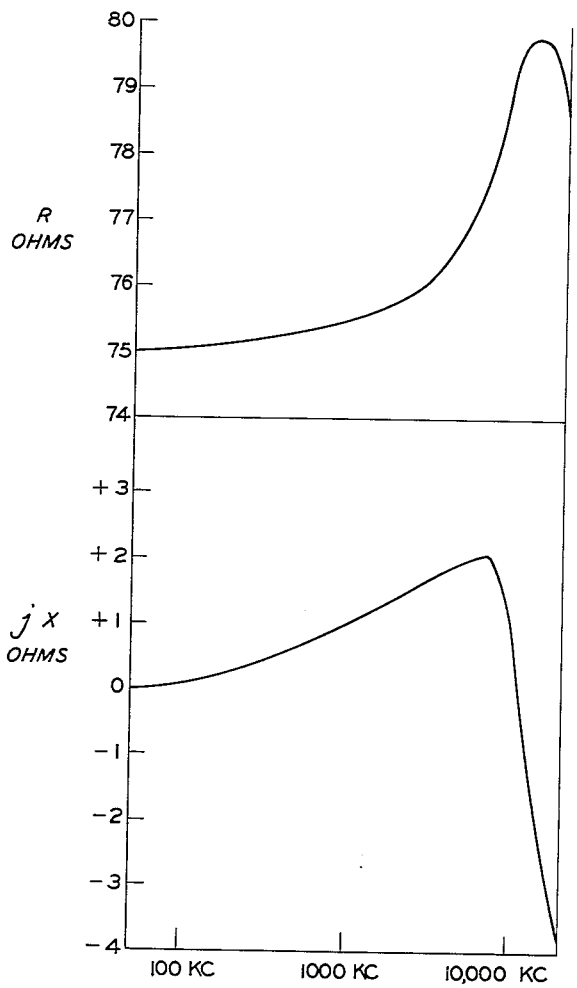
Fig. 11 is a plot of impedance values as a function of frequency in an illustrative series of measurements.

The validity of the impedance measurements in accordance with the invention has been verified experimentally at frequencies up to 80 megacycles. For example, a ten-foot length of a certain type of cable RG6/U having a nominal surge impedance of 75 ohms was terminated at one end in a standard resistor of 75.01 ohms measured resistance. The impedance looking into the cable from the other end was measured over the range from 0.05 megacycle to 20 megacycles by the means and method of the present invention and the results plotted as shown in Fig. 11. The apparently slight mismatch between the actual surge impedance of the nominal 75-ohm cable and the substantially purely resistive 75.01-ohm termination was sufficient to produce the pronounced impedance variations shown. At 7.8 megacycles, the cable was one-eighth of a wavelength long and the reflection from the mismatch tended to enhance the reactive component of the cable input impedance. At 15.6 megacycles the cable was one-quarter wavelength long and the reflection tended to enhance the resistive component of the cable input impedance.

As the lines, such as coaxial cables, used to connect the parts of the measuring circuit have a surge impedance which is a function of frequency and which is subject to variation within limits of manufacturing tolerances, the impedance $Z_0$ is not constant if a relatively wide frequency band is considered and is dependent upon the specific line used. When a direct-reading chart such as that of Fig. 8 is used an error results, the magnitude of which may be computed by the method hereinafter described.

Error computation

In computing errors it is convenient to define a quantity $\delta_z$ by means of the equation $$Z_0 = R_0 + \delta_z \quad (12)$$

where $\delta_z$ represents the difference existing between the actual $Z_0$ and the value of $R_0$ assumed in making the direct-reading chart, such as that of Fig. 8. It is also convenient to let $\epsilon_z$ represent the difference between $R_0$ and the unknown impedance $Z$, from which $$Z = R_0 + \epsilon_z \quad (13)$$

The measurement procedure described hereinabove prescribes setting the loss and phase readings of the measuring set to the theoretical values read from the chart for the value of $R_0$ when the standard impedance is inserted, even though $Z_0$ differs by $\delta_z$ from $R_0$ as per Equation 12. This procedure introduces an error which will be designated by $\Delta$ which affects both the loss reading and the phase reading.

A complete expression for $\Delta$ has been found to be:

$$\Delta = \log\left[1 + \frac{\frac{\delta_z}{3R_0}\left(1 + \frac{R_0}{2Z}\right) - \frac{\delta_z}{2Z}}{\left(1 + \frac{R_0}{2Z}\right) + \frac{\delta_z}{2Z}}\right] \quad (14)$$

If $\delta_z$ is small compared to $R_0$, Equation 14 reduces to $$\Delta = \log\left(1 + \frac{\delta_z}{3R_0} - \frac{\delta_z}{2Z + R_0}\right) \quad (15)$$

which by substitution from Equation 13 becomes $$\Delta = \log\left(1 + \frac{\delta_z}{3R_0} - \frac{\delta_z}{3R_0 + 2\epsilon_z}\right) \quad (16)$$

If $\epsilon_z$ also is small compared to $R_0$, then Equation 16 reduces to $$\Delta = \log\left(1 - \frac{\delta_z \epsilon_z}{4.5 R_0^2}\right) \quad (17)$$

and then since $\delta_z$ and $\epsilon_z$ are both small compared to $R_0$, we finally obtain $$\Delta = -\frac{\delta_z \epsilon_z}{4.5 R_0^2} \quad (18)$$

which is in nepers as affecting loss readings and radians as affecting phase readings.

To evaluate $\Delta$ more specifically, the components of $\delta_z$ and $\epsilon_z$ may be expressed as follows:

$$\delta_z = \delta_R + j\delta_X \quad (19)$$

$$\epsilon_z = \epsilon_R + j\epsilon_X \quad (20)$$

in ohms. Then the real part of the product $\delta_z \epsilon_z$ is a factor in the error in loss and the imaginary part is a factor in the error in phase. Substituting from 19 and 20 into Equation 18 and taking $R_0$ as 75 ohms, and also converting units of loss to decibels and units of phase shift into degrees gives $$\Delta_{\text{Loss}} = 3.4 \times 10^{-4}(\delta_R \epsilon_R - \delta_X \epsilon_X) \text{ db} \quad (21)$$

$$\epsilon_{\text{Phase}} = 2.26 \times 10^{-3}(\delta_X \epsilon_R + \delta_R \epsilon_X) \text{ degrees} \quad (22)$$

In practice the $\Delta$ errors are negligible in most instances. For a given value of $\delta_z$ the error $\Delta$ decreases approximately linearly as the unknown impedance $Z$ approaches $R_0$.

If the error computed in the above described manner is significant it is usually as convenient to use the actual value of $Z_0$ in computing the unknown impedance instead of applying the error correction to the value of the unknown impedance obtained on the basis of an assumed value of $R_0$.

Where accurate impedance measurements are required over only a small portion of the impedance plane, the apparatus may be simplified because it need provide for only a small range of loss value and phase shift. Also, where a loss and phase measuring set must be provided primarily for measuring losses and phase shifts, the set may be converted readily and inexpensively to measure impedances as well, by the mere addition of a line bridging device such as the T joint 20, no matter how elaborate the original measuring set may be.

It is to be understood that the above-described arrangements and methods are illustrative of the application of the principles of the invention. Numerous other arrangements may be devised by those skilled in the art without departing from the spirit and scope of the invention.

What is claimed is:

1. Apparatus for making electrical measurements upon a piezoelectric crystal unit with correction for the inherent shunt capacitance of the electrodes thereof, comprising a standard reference transmission line, a comparison transmission line, sending means common to said lines, receiving means common to said lines, a low-pass filter in one of said lines, said filter having a variable shunt capacitor, means for connecting a piezoelectric crystal unit in parallel with said variable shunt capacitor, and means associated with said receiving means for indicating amplitude and phase differences in the respective outputs of said lines.

2. Apparatus for making electrical measurements upon a piezoelectric crystal unit with correction for the inherent shunt capacitance of the electrodes thereof comprising a standard reference transmission line, a comparison transmission line, sending means common to said lines, receiving means common to said lines, amplitude and phase compensating means in at least one of said lines, a low-pass filter in one of said lines, said filter having a variable shunt capacitor, means for connecting a piezoelectric crystal unit in parallel to said variable shunt capacitor, and means associated with said receiving means for indicating amplitude and phase differences in the respective outputs of said lines.

3. Apparatus for making electrical measurements upon a piezoelectric crystal unit with correction for the inherent shunt capacitance of the electrodes thereof, comprising a standard reference transmission line, a comparison transmission line, sending means common to said lines, receiving means common to said lines, amplitude and phase compensating means in at least one of said lines, a pair of low-pass filters each individual to one of said lines, each said filter having a variable shunt capacitor, means for connecting a piezoelectric crystal unit in parallel to the said variable shunt capacitor in one of said filters, and means associated with said receiving means for indicating amplitude and phase differences in the respective outputs of said lines.

4. Method of nullifying the electrode capacitance in measurements on piezoelectric crystal units and the like, employing a low-pass filter adjustable as to its surge impedance by means of a variable shunt capacitor, which method comprises terminating said filter with a standardized known impedance element, adjusting said filter to make its surge impedance equal to its terminating impedance, connecting a piezoelectric crystal unit to be measured in parallel with the said variable shunt capacitor, and readjusting the said variable shunt capacitor of the filter to make the surge impedance again equal to its terminating impedance at a frequency remote from a resonance frequency of the crystal unit, whereby the electrode capacitance of the crystal unit plus the capacitance of the variable shunt capacitor in parallel therewith is made equal to the capacitance which the variable shunt capacitor had as a result of the said first adjusting step.

5. Method of nullifying the electrode capacitance in measurements on piezoelectric crystal units and the like, employing a pair of low-pass filters each adjustable as to its surge impedance by means of a variable shunt capacitor, which method comprises terminating each said filter with a standardized known impedance element, adjusting each said filter separately to make its surge impedance equal to the respective terminating impedance, connecting a piezoelectric crystal unit to be measured in parallel with the said variable shunt capacitor in one of said filters, comparing the transmission characteristics of said two filters, one having said piezoelectric crystal unit connected and adjusting the said variable shunt capacitor of the filter which has the said crystal unit connected to obtain equal transmission characteristics in the two filters in a frequency range remote from the resonance frequency of the crystal unit, whereby the electrode capacitance of the crystal unit plus the capacitance of the variable shunt capacitor in parallel therewith is made equal to the capacitance of the variable shunt capacitor in the other filter.

6. Method of measuring the resistive and reactive impedance components of a two-terminal device irrespective of an inherent shunt capacitance within said two-terminal device, using a standard impedance element and a pair of substantially identical low-pass filter structures each having an adjustable shunt capacitor, in a measuring set capable of measuring insertion loss and insertion phase shift and having a standard transmission line portion and a comparison transmission line portion, means for adjusting attenuation in one of said lines, means for adjusting phase shift in one of said lines, and calibrated means for indicating amplitude differences and phase differences between the outputs of said standard and comparison lines, which method comprises inserting said standard impedance element in said comparison line, adjusting the relative attenuation and phase shift of said lines to secure readings in said indicating means nominally corresponding to the insertion of said standard impedance element, inserting one of said filter structures between said comparison line and said standard impedance element, adjusting the said shunt capacitor in said filter structure to restore the said indicating means to the previous readings, thereby rendering said filter substantially transparent, similarly adjusting the second of said filters to substantial transparency, thereby effecting a substantial balance between said first and second filters, inserting said balanced filters respectively in said standard and comparison lines, adjusting said lines to equality of attenuation and phase shift, inserting the said two-terminal device in shunt relation to the said variable capacitor in one of said filters, readjusting the variable capacitor in said filter to restore said lines to balance using a measuring frequency at which the said two-terminal device has impedance substantially wholly caused by said inherent shunt capacitance, and thereupon varying the measuring frequency to a value at which measurements are to be made.

7. Method of measuring the resistive and reactive impedance components of a two-terminal device irrespective of an inherent shunt capacitance within said two-terminal device using a standard impedance element and a pair of substantially identical low-pass filter structures each having an adjustable shunt capacitor, and a measuring set capable of measuring insertion loss and insertion phase shift and having a standard transmission line portion and a comparison transmission line portion, said standard transmission line portion having a main adjustable attenuator and a main adjustable phase shifter, one of said lines having an auxiliary adjustable attenuator and an auxiliary adjustable phase shifter, all said adjustable elements being calibrated, and said measuring set having means for indicating amplitude differences and phase shift differences, respectively, between the outputs of said standard and comparison lines, which method comprises inserting said standard impedance element in said comparison line, setting said main adjustable attenuator to read the nominal attenuation to be expected in said comparison line upon insertion of said standard impedance element, setting said main adjustable phase shifter to read the nominal phase shift to be expected in said comparison line upon insertion of said standard impedance element, adjusting said auxiliary attenuator and said auxiliary phase shifter to obtain null readings in said amplitude and phase shift difference indicating means respectively, inserting one of said filter structures between said comparison line and said standard impedance element, adjusting said filter structure to restore null readings in said amplitude and phase shift difference indicating means respectively, thereby rendering said filter substantially transparent, substituting the other of said filters for the first said filter and adjusting said second filter in like manner thereby rendering said second filter substantially transparent and effecting a substantial balance between said first and second filters, inserting said balanced filters respectively in said standard transmission line portion and said comparison transmission line portion, setting said main attenuator to zero insertion loss and said main phase shifter to zero insertion phase shift, inserting the said two-terminal device in shunt relation to the said variable capacitor in the filter in said comparison line, readjusting said variable capacitor to restore null readings in said amplitude and phase shift difference indicating means respectively using a measuring frequency at which the said two-terminal device has impedance substantially wholly caused by said inherent shunt capacitance, and thereupon varying the measuring frequency to a value at which measurements are to be made.

8. Method of measuring the resistive and reactive impedance components of a two-terminal device irrespective of an inherent shunt capacitance within said two-terminal device using a standard impedance element and a low-pass filter having an adjustable shunt capacitor, and a measuring set capable of measuring insertion loss and insertion phase shift and including a standard transmission line and a comparison transmission line, said lines including a calibrated adjustable attenuator and a calibrated adjustable phase shifter, which method comprises inserting said standard impedance element in the comparison transmission line, setting said attenuator and said phase shifter respectively to the nominal insertion loss and insertion phase shift of the standard impedance element for the comparison transmission line, balancing the respective attenuations and the respective phase shifts in the said standard and comparison lines without disturbing the settings of the said attenuator and the said phase shifter, inserting the said filter between the comparison transmission line and the standard impedance element, adjusting the adjustable shunt capacitor of the filter to restore the balance of the respective attenuations and the respective phase shifts in the said standard and comparison lines without disturbing the settings of the said attenuator and the said phase shifter, thereby rendering said filter substantially transparent, disconnecting the said standard impedance element and the said filter from the said comparison line, inserting said filter in tandem in said comparison line, inserting the two-terminal impedance element to be measured in shunt relation to the said variable capacitor in the filter, readjusting said variable capacitor to restore the balance of the respective attenuations and the respective phase shifts in the said standard and comparison lines using a measuring frequency at which the said two-terminal device has impedance substantially wholly caused by its inherent shunt capacitance, and thereupon varying the measuring frequency to a value at which impedance measurements are to be made on the two-terminal device and determining the insertion loss and the insertion phase shift at the new frequency.

9. Method of nullifying a stray impedance of a given device in measurements on said device, employing a transmission system adjustable as to its surge impedance, which method comprises terminating said transmission system with a standardized known impedance element, adjusting said transmission system to make its surge impedance equal to the terminating impedance, connecting the given device to said transmission system, and readjusting said transmission system to make the surge impedance again equal to its terminating impedance at a frequency for which the impedance of the given device is substantially only its said stray impedance.

10. Method of nullifying a stray impedance of a given device in measurements on said device, employing a pair of transmission systems each adjustable as to its surge impedance, which method comprises terminating each said transmission system with a standardized known impedance element, adjusting each said transmission system separately to make its surge impedance equal to the respective terminating impedance, connecting the given device to one of said transmission systems, comparing the transmission characteristics of said two transmission systems, one having the given device so connected, and adjusting the surge impedance of the said system which has the given device connected to obtain equal transmission characteristics in the two said transmission systems in a frequency range in which the given device has impedance caused substantially wholly by said stray impedance.

11. Apparatus for making electrical measurements upon a given device with correction for an inherent stray impedance between a pair of electrodes within said device, comprising a standard transmission line, a comparison transmission line, sending means common to said lines, a portion of one of said lines being adjustable as to surge impedance, comparison means for comparing transmission characteristics of said lines, means for connecting the given device to said adjustable line portion, and means associated with said comparison means for indicating amplitude and phase differences in the respective outputs of said lines.

12. Apparatus for making electrical measurements upon a given device with correction for an inherent stray impedance between a pair of electrodes within said device, comprising a standard reference transmission line, a comparison transmission line, sending means common to said lines, comparison means for comparing transmission characteristics of said lines, amplitude and phase compensating means in at least one of said lines, means for connecting the given unit to one of said lines, means in the last-mentioned line to make said line substantially transparent at a frequency at which the given device has impedance caused substantially wholly by said stray impedance, and means associated with said receiving means for indicating amplitude and phase differences in the respective outputs of said lines.

13. A network for nullifying a stray impedance in a given device undergoing transmission measurements, said network comprising a transmission line, a standardized known impedance element terminating said line at one end thereof, and means to connect the given device to said line, said line being so designed and constructed that its surge impedance with the given device connected thereto is equal to the impedance of said terminating element at a frequency at which the given device has impedance caused substantially wholly by said stray impedance.

References Cited in the file of this patent

UNITED STATES PATENTS

| | | |
|---|---|---|
| 1,596,942 | Nyquist et al. | Aug. 24, 1926 |
| 1,684,403 | Mason | Sept. 18, 1928 |
| 2,047,782 | Jensen | July 14, 1936 |
| 2,267,430 | Slezskinsky | Dec. 23, 1941 |
| 2,416,310 | Hansen et al. | Feb. 25, 1947 |
| 2,416,790 | Barrow | Mar. 4, 1947 |
| 2,547,802 | Woodward | Apr. 3, 1951 |
| 2,557,798 | Reitz | June 19, 1951 |

OTHER REFERENCES

The General Radio Experimenter, vol. XXIV, No. 8, January 1950, page 7, General Radio Co., Cambridge, Mass.